Jan. 14, 1964   H. F. STERLING ET AL   3,117,838
MANUFACTURE OF SILICA
Filed July 18, 1958
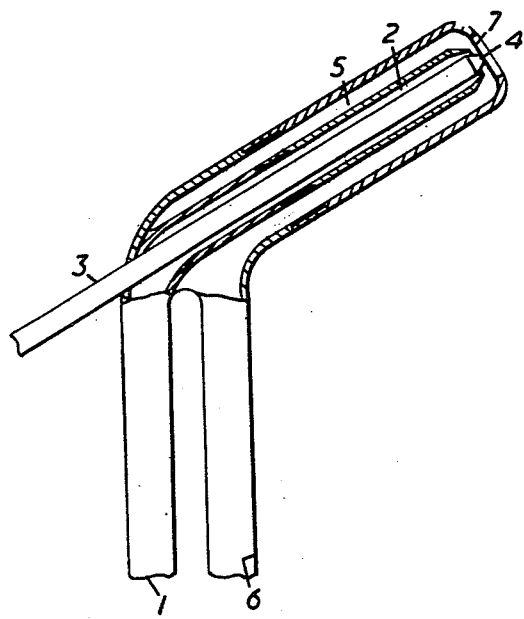
Inventors
H.F.STERLING-F.J.RAYMOND
By
Attorney ns
3,117,838
MANUFACTURE OF SILICA
Henley Frank Sterling and Frederick John Raymond, London, England, assignors to International Standard Electric Corporation, New York, N.Y.
Filed July 18, 1958, Ser. No. 749,433
Claims priority, application Great Britain Aug. 2, 1957
7 Claims. (Cl. 23—182)

This invention relates to the manufacture of silica in very pure form.

Fused quartz or silica is used as the material for vessels etc. in which many chemical reactions are carried out in preference to glass either because of the higher temperatures which silica will stand and/or because of the less likelihood of impurities dissolving out from silica.

A method of "pulling" monocrystalline silicon from a melt of silicon is often practised with such melt contained in a crucible of silica. It is found however, that an appreciable quantity of the material of the crucible is lost in the melt. Consequently any impurities in such crucible enter into the crystal of silicon. This is illustrative of the importance of obtaining pure silica.

We have found that silicon of a very high degree of purity for semi-conductor devices can be produced by the process of the thermal decomposition of silane described and claimed in British patent specification No. 745,698. According to this specification substantially pure silicon can be manufactured by passing substantially pure silane in a molecular concentration substantially less than normal into a zone heated to a temperature at least equal to the decomposition temperature of silane. A method of decomposing silane by radio-frequency dissociation to deposit silicon is described in British specification No. 20,960/57 (now British patent specification No. 885,117, issued April 10, 1962). According to this specification high purity silicon can be produced by passing a gaseous hydride of a semiconductor element, namely, silicon, through a zone in which the gas is decomposed to silicon and monatomic hydrogen by means of electromagnetic energy present in the zone. On leaving this zone, some of the monatomic hydrogen recombines to diatomic hydrogen with liberation of further energy in the form of heat which is sufficient to melt the semiconductor element.

It is the object of the present invention to adapt these methods for the production of silica of high purity.

According to the present invention therefore very pure silica is produced by the combined thermal decomposition and oxidation of silane.

Several examples of processes according to the invention are described in the following:

Example 1

The apparatus described in British specification No. 31,425/57 (now British patent specification No. 826,575, issued May 4, 1960), for the decomposition of silane on to a silicon seed is utilised, but in place of a silicon seed a body of carbon is used and is heated by the induction coil therein described to a temperature of 800° C.

A mixture of one volume of silane $SiH_4$ to two volumes of carbon dioxide is diluted with argon to a molecular concentration of about 0.25 percent and the combined gases passed through the decomposition chamber at the rate of about 200 litres per hour.

A reaction occurs upon the surface of the carbon former according to the equation

$$SiH_4 + 2CO_2 = SiO_2 + 2CO + 2H_2$$

The silicon dioxide is deposited upon the heated carbon former and the carbon monoxide and hydrogen are swept out of the chamber by the diluting argon.

A body of pure transparent quartz is thus grown, the carbon former with the quartz deposited thereon being withdrawn gradually from the decomposition zone at a rate determined by the rate of growth of the quartz body.

Example 2

The same apparatus and method are used as in Example 1 except that the carbon dioxide is replaced by nitrous oxide. Decomposition and deposition of quartz take place in accordance with the formula

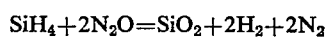
$$SiH_4 + 2N_2O = SiO_2 + 2H_2 + 2N_2$$

Example 3

Using the same apparatus as in Example 1, the carbon dioxide is replaced by water vapour.

Decomposition and deposition of quartz take place according to the formula

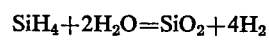
$$SiH_4 + 2H_2O = SiO_2 + 4H_2$$

It is pointed out in British specification No. 15,794/58 (now British patent specification No. 885,119, issued April 10, 1962) that is is advantageous to add a small trace of water vapour (about 0.5 part per million by volume) to silane which is being decomposed to produce silicon. This trace of water vapour hydrolises any diborane present to an oxide of boron which is volatile at the temperature of decomposition of silane and so is carried away from the body of silicon formed. It is also pointed out in that specification that a larger amount of water vapour than a trace tends to form silicon monoxide which may contaminate the silicon. If, however, stoichiometric proportions of silane and water vapour be used, in accordance with the present invention, silicon dioxide and not silicon monoxide is formed.

Any small trace of diborane present with the silane will in any of the examples given in the present specification, react with the oxidising agent (carbon dioxide, nitrous oxide, water vapor) and will be oxidised to an oxide of boron. Any oxide of boron is volatile at the temperatures at which silica is deposited and hence the silica formed is completely free from contamination with boron compounds.

Example 4

Silane and oxygen are fed into a burner or torch jet and the flame allowed to impinge on the substrate upon which silica is to be deposited, e.g., a substrate of carbon.

The apparatus used is shown in the accompanying drawing. Silane drawn from a storage tank is led via a reducing valve (not shown) through an inlet pipe to an outlet tube 2 which surrounds a pipe 3. The pipe 3 ends near the outlet of tube 2 in a nozzle 4. The pipe 3 is fed with oxygen through a suitable valve (not shown). Surrounding the tube 2 is a further tube 5 fed at 6 with oxygen through a suitable reducing valve (not shown). The tube 5 has a terminating aperture 7 just beyond the exit of tube 2 and the nozzle 4. The silane emerging from the torch jet spontaneously ignites with the oxygen. It will be seen that oxygen is supplied both to the interior and exterior of the jet of silane thus ensuring complete combustion to silica.

The flow of oxygen and the flow of silane are regulated to ensure an excess of about 25% by volume of oxygen. The rate of flow of silane through tube 1 is, for example, regulated to be 4 litres per minute under a pressure of 5 lbs. per square inch and the rate of flow of oxygen through each of the tubes 3 and 6 is regulated to be 10 litres per minute in each of them under the same pressure of 5 lbs. per square inch. The yield of silica in such a case is about 640 g. per hour.

*Example 5*

A mixture of silane, argon and water vapour is fed through a radio frequency jet which forms a voltage anti-nodal point of a radio-frequency oscillator feeder system, as described in the aforementioned British specification No. 20,960/57 for the radio frequency dissociation of silane. Silane and water vapour combine chemically with formation of silica and hydrogen. The hydrogen is dissociated by the radio frequency field into mon-atomic form and the atoms reassociate on leaving this field to produce enough heat to melt the produced silica which is sprayed on to any suitable substrate.

Other mixtures of gases as mentioned in Examples 1 and 2 above may be used with this method of producing silica.

While the principles of the invention have been described above in connection with specific embodiments, and particular modifications thereof, it is to be clearly understood that this description is made only by way of example, and not as a limitation on the scope of the invention.

What we claim is:

1. A method for the manufacture of silica of high purity which comprises:
   (a) forming a gas mixture including silane and a reactive gas selected from the group consisting of carbon dioxide, nitrous oxide, gaseous oxygen, and water vapor, said reactive gas being present in at least the stoichiometric proportion required to produce complete oxidation of the silane to silica;
   (b) providing a solid carbon surface;
   (c) producing an oxidation reaction between said reactive gas and said silane at an elevated temperature to form molten silica; and
   (d) accumulating said molten silica on said carbon surface to form a solid body of transparent, high purity silica.

2. A method for the manufacture of silica of high purity which comprises:
   (a) forming a gas mixture including silane and a reactive gas selected from the group consisting of carbon dioxide, nitrous oxide, gaseous oxygen, and water vapor, said reactive gas being present in at least the stoichiometric proportion required to produce complete oxidation of the silane to silica;
   (b) providing a solid carbon surface;
   (c) heating a continuous stream of said gas mixture to an elevated temperature to produce an oxidation reaction between said reactive gas and said silane to form a continuous stream of molten silica;
   (d) directing said stream of molten silica on said carbon surface; and
   (e) accumulating said molten silica on said carbon surface to form a solid body of transparent, high purity silica.

3. A method for the manufacture of silica of high purity which comprises:
   (a) forming a gas mixture including silane and a reactive gas selected from the group consisting of carbon dioxide, nitrous oxide, gaseous oxygen, and water vapor, said reactive gas being present in at least the stoichiometric proportion required to produce complete oxidation of the silane to silica;
   (b) providing a solid carbon surface;
   (c) heating said carbon surface to an elevated temperature at which an oxidation reaction between said reactive gas and silane will occur to form molten silica;
   (d) directing a continuous stream of said gas mixture on said carbon surface; and
   (e) accumulating said molten silica on said carbon surface to form a solid body of transparent, high purity silica.

4. A method for the manufacture of silica of high purity which comprises
   (a) forming a gas mixture consisting essentially of silane, an inert gas and a reactive gas selected from the group consisting of carbon dioxide, nitrous oxide, gaseous oxygen and water vapor, said reactive gas being present in a proportion of about two volumes for each volume of silane and the volume of said inert gas being substantially greater than the volume of said silane and reactive gas so the silane and reactive gas are in relatively weak concentrations,
   (b) providing a solid carbon surface,
   (c) heating said carbon surface to a temperature of about 800° C., and
   (d) continuously directing said gas mixture on to said heated surface, said silane being oxidized to silica which accumulates upon said surface in the form of a solid body of transparent silica of high purity.

5. A method for the manufacture of silica of high purity which comprises
   (a) forming a flame at a nozzle exit by the spontaneous combustion of a gas mixture comprising silane and gaseous oxygen containing excess of about 25% by volume of oxygen,
   (b) providing a solid carbon surface, and
   (c) directing said flame onto said surface whereby silica of high purity accumulates upon said surface to form a solid body of transparent silica.

6. A method for the manufacture of silica of high purity which comprises
   (a) forming a gas mixture consisting of silane, water vapor and argon,
   (b) providing a carbon surface,
   (c) passing said gas mixture through a coaxial transmission line to a jet nozzle,
   (d) applying radio frequency energy on said line with the exit of said nozzle at an antinodal point for said energy whereby heat generated by said energy dissociates said gas mixture components into silica and monatomic hydrogen at the exit of said nozzle,
   (e) melting said silica by the heat generated due to the reassociation of said monatomic hydrogen into diatomic hydrogen, and
   (f) directing said molten silica onto said surface whereby silica of high purity accumulates upon said surface to form a solid body of transparent silica.

7. A method for the manufacture of silica of high purity which comprises
   (a) passing gaseous oxygen through a first tube,
   (b) passing silane through a second tube surrounding said first tube,
   (c) passing gaseous oxygen through a third tube surrounding said second tube,
   (d) maintaining the same equal pressure of gas in all said tubes,
   (e) regulating the flow of gas in said tubes so the flow of gaseous oxygen in the first and third tubes is at least twice the rate of flow of silane through said second tube,
   (f) issuing said gases from said three tubes into a common zone adjacent the ends of said tubes to form a flame by spontaneous combustion of said gases in said common zone, and (g) directing said flame onto a surface of solid carbon whereby silica of high purity accumulates upon said surface to form a solid body of transparent silica.

References Cited in the file of this patent

UNITED STATES PATENTS

| | | |
|---|---|---|
| 1,850,286 | Mittasch et al. | Mar. 22, 1932 |
| 2,442,976 | Heany | June 8, 1948 |
| 2,625,874 | Pipkin | Jan. 27, 1953 |
| 2,635,946 | Weber et al. | Apr. 21, 1953 |
| 2,697,025 | Fulton et al. | Dec. 14, 1954 |
| 2,904,404 | Ellis | Sept. 15, 1959 |

FOREIGN PATENTS

| | | |
|---|---|---|
| 165,589 | Australia | Oct. 13, 1955 |
| 438,782 | Great Britain | Nov. 22, 1935 |

OTHER REFERENCES

Fiat Final Report, P.B. 22, April 1946, pages 1–12 (pages 7–11 of particular interest).

Mellor: "Comprehensive Treatise on Inorganic and Theoretical Chemistry," vol. 6, Longmans, Green and Co., New York, 1925, pages 216, 218 and 220.